UNITED STATES PATENT OFFICE.

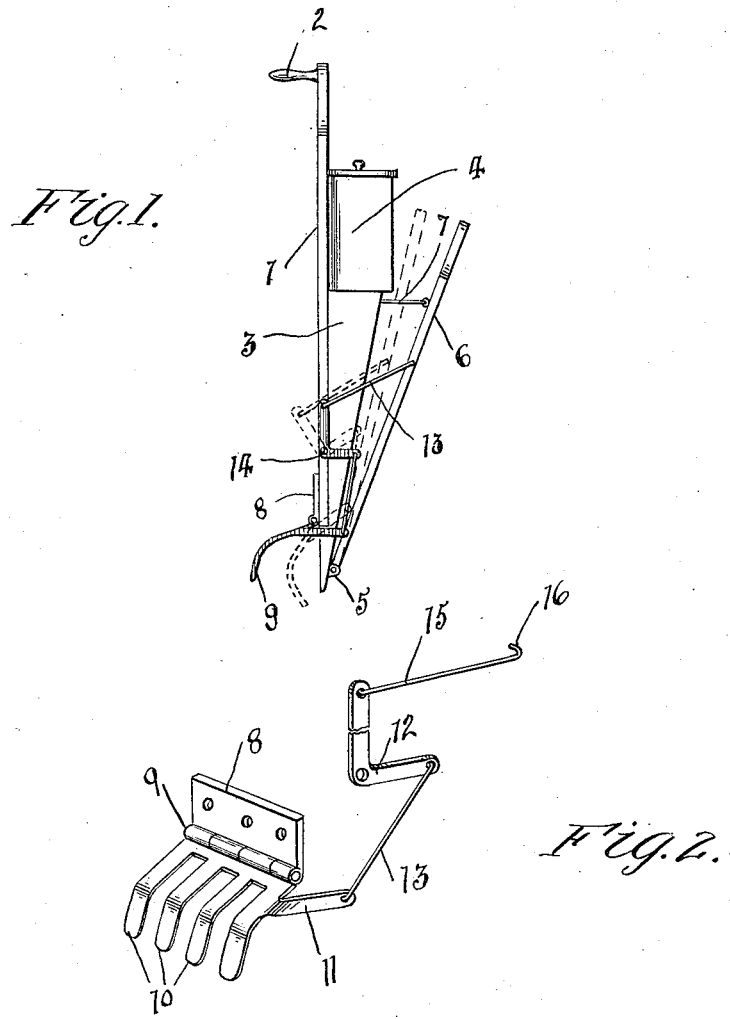

JOSEPH SOMMER, OF CINCINNATI, OHIO, ASSIGNOR OF ONE-HALF TO GEORGE CARY, OF CHICAGO, ILLINOIS.

HAND CORN-PLANTER.

1,083,414.      Specification of Letters Patent.      Patented Jan. 6, 1914.

Application filed January 4, 1912. Serial No. 669,373.

*To all whom it may concern:*

Be it known that I, JOSEPH SOMMER, a citizen of the United States, residing at South Cummingsville, Cincinnati, Ohio, have invented new and useful Improvements in Hand Corn-Planters, of which the following is a specification.

My invention relates to attachments for hand corn planters.

An object of my invention is to provide an attachment for hand corn planters whereby after the kernels of corn have been dropped into a furrow they may be easily covered.

Another object of my invention is to provide a device of the above mentioned character which is simple in construction and easy to attach to different forms of hand corn planters now in use.

With the foregoing and other advantages in view, my invention relates to such details of construction and in the arrangement and combination of parts as will be hereinafter fully described and specifically pointed out in the appended claims.

In describing my invention in detail reference will be had to the accompanying drawings in which like characters denote like or corresponding parts throughout the several views and in which, Figure 1 is a side elevation of my invention shown attached to a form of hand corn planter. Fig. 2 is a perspective view of my invention.

I desire it to be understood that I do not limit myself to the use of a specific form of corn planter shown in the drawing and that I may substitute any other form without departing from the spirit of my invention in the least.

In the accompanying drawings which fully illustrate my invention 1 designates the body of the corn planter which body portion is provided with a hand grip 2 at the upper end thereof and is further provided with a tapering feed spout 3. Carried upon the upper end of the feed spout 3 and communicating therewith is a corn reservoir 4 the construction of which is well known in the art.

Pivoted to the lower end of the body portion 1 as shown at 5 is the lower end of an operating member 6 which operating member 6 has suitable connections such as at 7 whereby it may operate a slide valve within the feed spout 3 (not shown). It will now be readily recognized that when the operating member 6 is as shown in full lines in Fig. 1, corn will be allowed to drop through the feed spout 3. However, when the operating member is moved to the position shown in dotted lines in the same Fig. 1, passage of corn will be stopped.

In the construction of my invention I provide a bracket 8 which is suitably secured near the lower end of the body portion 1 of the corn planter. Hingedly connected as shown at 9 to the bracket 8 is the toothed portion 10 upon one end of which is formed an extension 11, the said extension having connection with one end of a bell crank lever 12 as shown at 13. The bell crank lever 12 is pivoted as shown at 14 upon the body portion 1 and is connected to the operating member 6 by a rod 15 the said rod being provided with a curved end 16. It will be readily seen that by providing a curved end 16 my invention can be connected or disconnected to or from the operating member if occasion requires.

It will now be obvious that when the operating member is as shown in full lines in Fig. 1, corn will be dropped as above described and the teeth 10 held in what may be called an inoperative position. However, when the operating member 6 is moved into a position shown in dotted lines in the above-mentioned figure, the passage of corn will not only be stopped but the teeth 10 will be rocked in such a manner as to throw a quantity of dirt upon the kernels just deposited.

In order to effectively cover the seed upon elevation of the planter body immediately following the dropping movement thereof, the seed covering means is pivoted on that side of the body portion opposite to the side on which the member 6 is mounted. This provides for the interposition of a link means so as to dispose and permit disposition of the fingers 10, in such relation to the planter body as to permit of covering the seed at each elevation of the planter body immediately following the dropping movement thereof. This arrangement and construction is most effective where the manipulating handle for the planter body is rigid, as shown.

Attention is called to the simplicity of my invention and the easy mode of attachment to ordinary forms of corn planters.

It is thought that from the foregoing disclosure, the advantages and novel features of my invention will be appreciated.

I desire to be understood that I may make slight changes in the construction of my invention without departing from the spirit thereof, provided, however, such changes fall within the scope of the sub-joined claims.

Having thus fully described my invention what I claim as new and desire to secure by Letters Patent is:

1. In a device of the character described, a hand operated seed planter having a fixed manipulating handle and a body portion provided with an outlet for discharge of the seed, an operating member on one side of said body portion for controlling discharge of the seed, seed covering means actuated by said member and pivoted on that side of the body portion opposite to said member for covering the seed dropped upon each elevation of the body portion immediately following the lowering or dropping thereof.

2. In an attachment of the above mentioned character, a plate adapted to be secured to the body portion of a corn planter, teeth, pivoted to said plate, an extension formed upon one of said teeth and means connecting said extension and the operating member of said corn planter whereby said teeth may be rocked, for the purpose described.

3. In an attachment of the foregoing nature, a plate rigidly secured upon a body portion of a hand corn planter, teeth pivotally connected to said plate, an extension formed upon one of said teeth, a bell crank lever pivoted upon said corn planter, means connecting said extension and one end of said bell crank lever, and means connecting the other end of said bell crank lever and the operating member of said corn planter whereby when said operating member is moved said teeth will be rocked, for the purpose described.

4. In an attachment for hand corn planters, a plate secured to the lower part of a corn planter, teeth pivotally secured to said plate, one of said teeth being provided with an extension, a bell crank lever pivoted upon said corn planter, means connecting said extension and one end of said bell crank lever, a rod connected to the upper end of said bell crank lever, the other end of said rod adapted to be connected to the operating member of said corn planter whereby when said operating member is moved said teeth will be rocked, for the purpose described.

5. In a device of the character described, the combination with a corn planter, a plate rigidly secured thereto, a plurality of teeth having hinged connection with said plate, said teeth being bent intermediate their ends, an extension formed integral with one of said teeth, a substantially bell crank lever pivoted upon said corn planter, a rod connecting one end of said lever and said extension, an operating member pivoted upon said corn planter, a link connecting the upper extremity of said operating member and the other end of said bell crank lever whereby when said operating member is moved, said teeth will be rocked as and for the purpose set forth and described.

JOSEPH SOMMER.

Witnesses:
  G. A. CARY,
  A. M. CARY.

---

Copies of this patent may be obtained for five cents each, by addressing the "Commissioner of Patents, Washington, D. C."